US009516816B2

(12) United States Patent
Allochis (10) Patent No.: US 9,516,816 B2
(45) Date of Patent: Dec. 13, 2016

(54) MULTIPLE DRUMS CONVEYOR FOR AN AGRICULTURAL PLATFORM

(71) Applicant: Jose Luis Allochis, Buenos Aires (AR)

(72) Inventor: Jose Luis Allochis, Buenos Aires (AR)

( * ) Notice: Subject to any disclaimer, the term of this patent is extended or adjusted under 35 U.S.C. 154(b) by 0 days.

(21) Appl. No.: 14/680,428

(22) Filed: Apr. 7, 2015

(65) Prior Publication Data

US 2016/0295800 A1 Oct. 13, 2016

(51) Int. Cl.
*A01D 41/14* (2006.01)
*A01D 61/00* (2006.01)
*A01D 34/14* (2006.01)

(52) U.S. Cl.
CPC ............ *A01D 61/008* (2013.01); *A01D 34/14* (2013.01); *A01D 41/14* (2013.01); *A01D 61/002* (2013.01)

(58) Field of Classification Search
CPC ........ A01D 41/06; A01D 57/20; A01D 41/14; A01D 61/02; A01D 57/30
USPC .. 56/181–183, 14.5–14.6, 12.4, 208; 460/70, 71
See application file for complete search history.

(56) References Cited

U.S. PATENT DOCUMENTS

| | | | | |
|---|---|---|---|---|
| 2,599,438 A * | 6/1952 | Downing | ............... | A01D 34/83 56/158 |
| 3,244,271 A * | 4/1966 | Wenning | ............. | A01D 61/004 198/669 |
| 4,248,248 A * | 2/1981 | De Busscher | .......... | A01F 12/22 460/68 |
| 6,564,535 B1 * | 5/2003 | Nafziger | ............. | A01D 61/008 198/666 |
| 6,729,952 B2 * | 5/2004 | Voss | ........................ | A01F 7/067 460/71 |
| 6,865,871 B2 * | 3/2005 | Patterson | ............... | A01D 57/20 56/14.5 |
| 7,802,417 B2 * | 9/2010 | Sauerwein | ............. | A01D 41/14 56/181 |
| 8,109,815 B2 * | 2/2012 | Hollatz | ................... | A01F 7/067 460/16 |

FOREIGN PATENT DOCUMENTS

GB 2200526 A * 8/1988 ............. A01D 41/06

* cited by examiner

*Primary Examiner* — John G Weiss
(74) *Attorney, Agent, or Firm* — Defillo & Associates, Inc.; Evelyn A. Defilló

(57) ABSTRACT

A feeder drum used in an agriculture head to force the cut crop through an opening of the head. More specifically, the feeder drum is used to produce the transition from the lateral movement of the crop through the platform to a transverse longitudinal movement (with respect to lateral movement) which directs it to the platform carrier's feeder. Even more specifically, the feeder drum comprises a plurality of fins or blades attached to a cylinder, wherein the fins contain one side with a profile describing a convex curve.

15 Claims, 8 Drawing Sheets

MULTIPLE DRUMS CONVEYOR FOR AN AGRICULTURAL PLATFORM

TECHNICAL FIELD

The present invention relates to harvesting platforms of the type that are carried on the front end of a combine tractor. More specifically, the present invention relates to set of feeder drums which are used in agriculture headers to direct the cut crop in a desired direction. The feeder drums are incorporated into platforms to force the crop material to flow through an open end of the platform so that it can be picked up by the carrier harvester feeder-house.

BACKGROUND OF THE INVENTION

A platform used in agriculture harvesting crops is universally defined as a head attached to a harvesting machine and that serves as a removable attachment for use when cutting requirements are request. It is made and assembled onto a main frame or chassis which is divided into a central section, the area corresponding to coupling with the harvester, and two side sections wings, that projects on either side of said central section according to a perpendicular direction to the advance direction of the harvesting machine. The platform has a cutting mechanism cutterbar projecting laterally across the width thereof, defined in front of the side sections and center section, and is configured to sever the standing crop.

Platforms contain a system for the transverse movement of the crop material. Typically it is formed by a helical screw conveyor and alternately today there exist systems containing a set of canvas or drapers for conveying. Both the canvas draper and the screw conveyor operate to transport the crop cut by the cutterbar and drive it into the center section. Furthermore, it is well known there are multitudes of arrangements where gadgets are used to force the material that reaches the center section of platform to pass through the feederhouse and to the combine's feeder thereof, to be later treshed by the harvester. Each prior art heads prefer one of these devices and determine the input mode of the crop material to the feeder of the harvester.

Finally, it is known that the cutterbar of some cutting platform is configured to flex in response to ground shape. In these, a series of sliding plates skid shoes are linked to said cutterbar to confer the ability to settle above the ground and slipping while operating. All this in view of making the cut of the plant as close to the ground as possible in practice, allowing the collection of those pods with beans sprouting in the lower part of the stem. Thus, when the head is advanced in work, the cutterbar is positioned virtually glued to the ground and curling up to mimic the natural unevenness of the field, resulting into a crop cut at constant height. While this well known in theory, most platform transitions from auger/flex-cutterbar to draper/flex-cutterbar does not respect the good design of the cutterbar of the first. In the chase of shortening the distance between the draper and the cutting zone most manufacturers have not developed a really effective, good angled, low losses cutterbar system.

Harvesting machines and threshing machines particularly relates to the sever and/or the collection of crops. These generally have an attached platform, arranged in the front part, which extends laterally to collect a preferred width of standing crop. This platform employs means of transportation for the delivery of the crop material to said harvesting machine for subsequent separation of grains and other treatments. The harvester/thresher uses a chain conveyor feeder to take the harvested crop in an essentially right angle from the platform.

There have been many mechanical devices designed for the transition from the lateral movement of the crop through the platform to a transverse longitudinal movement with respect to lateral movement, which directs it to the feederhouse, trying to turn ensure an even material flow. The main form of conveyor has a traverse screw type conveyor with a helical strip surrounding a cylinder in which several, at least two, opposite fillets with mounted blades are arranged on the outer surface of a cylinder, so that upon rotation of the drum the material is trapped between the ends of two straight opposite and helices is forced to move normal to the axis of rotation of said cylinder.

A feature which has been found relatively important to the successful transition of movement of the material to the feederhouse is the use of a plurality of retractable fingers configured to extend out of the cylinder of a screw conveyor (auger). These fingers are located in the intermediate section of the auger conveyor tube between the oppositely disposed screw flight on each end of the auger. This particular construction is shown in Patent Alvin W. Oehler, U.S. Pat. No. 2,529,180, Nov. 7, 1950. The core problem of the platforms that use a screw conveyor, with or without retractable fingers, for the transition of the crop material to the feederhouse of the harvester/thresher is its low capacity to manage material flow and the subsequent clogging of the mechanism.

Another form of cross conveyor mechanism was developed by Harvey Herndon, published as U.S. Pat. No. 2,671,553 on Mar. 9, 1954. This conveyor is constructed by a conveyor belt which covers the whole width of the feederhouse opening of the combine harvester and which is configured to run so that the upper portion of the belt carries the material to said feeder.

As it was found that the transverse feed belt itself was not able to feed and control the crop material volume delivered to the feeder, considerable width platforms are built especially with a secondary feeder apparatus including a rotatable member (cylinder) having retractable fingers and/or pallet members and which is mounted above the rear end of said central draper belt. Such a structure was revealed by Roger L. Patterson granted as U.S. Pat. No. 5,005,343 in Jul. 17, 1989 and as U.S. Pat. No. 4,956,966 in Sep. 18, 1990. This mechanism confines the material running over the cross conveyor belt and helps in feeding into the inlet opening of the feederhouse of the harvester. However, a design of this type has not been found capable of handling heavy crops without accumulation and jamming in front of the entrance to the feed channel. It is known that due to the nature of chain type of the feeder carrier of conventional harvesters, crop material has to be forced at the entrance of said feeder carrier for chains to be able to catch and transport it quickly. In an attempt to quickly feed material into the inlet opening, it was tried to drive the transverse conveyor belt at relatively high speeds.

Since increased flow velocity of the cross conveyor belt has not completely overcome the problem of clogging, an attempted solution has been developed by Gregory J. Honey, published as U.S. Pat. No. 5,464,371 in Nov. 7, 1995. In this structure there is one rotating drum disposed between the transverse belt conveyor platform and the inlet opening of the carrier feeder of the harvesting machine, whose rotation speed is set independently, and further characterized in that it has retractable fingers as means for engaging and dragging the material. However, even with the proposed improvements, the existence of the additional conveying element did not solve the lack of compression to the transverse flow material against the opening of the feeder carrier, a problem that grows when the crop is of bushy type, such as wheat, barley, or high yield soy bean and that cause jamming because the low ability to direct the entire flow of material.

There has been a continuing need to improve the technique of cross-mobilization mechanisms to reduce the complexity, and thus reduce the possibility of mechanical failure or jamming of the material, crop, between components. For example, Steve Tippery, Kaster Craig, Adam Lee Haworth, Cristoph Nathan and Jens Petersen, granted to CLAAS SELBSTFAHRENDE Erntemaschinen GMBH, Germany, revealed a solution mechanism in U.S. Patent U.S. Pat. No. 7,587,885 from Sep. 15, 2009. They determined, surprisingly, that the removal of the cross-carrying belt (central) improves feed efficiency of crop to the feeder carrier towards the harvester, and also produces a smoother transition from the lateral flow of material toward the cross-flow. The proposed mechanism is constructed using a cylindrical feeder drum, which combines the use of opposite helical flights and retractable fingers, and a floor-tray contoured that has two circular walls to force the material to change direction. However, it was found that the proposed solution mechanism is not able to handle large volumes, which have crops such as wheat, barley and high yield soy bean. In this mechanism, the working condition worsens to critical terms when it is necessary to advance the platform at high speeds, since the material (crop) begins to accumulate in the area near to the opening of the feederhouse until a point where the growth of mass of accumulated, unswallowed material is such that it is reached by the reel, which is followed by the latter engaging and throwing it forward, determining a circuit which is repeated while the volume of said material is not decreased (which always means slowing down harvest speed).

Lately, Deere & Company revealed a new approach that insist on the usage of a central canvas. This disclosure was published as US20140237979 in Aug. 28, 2014. The innovation consist of two new conveyor members (drums with a rotational axis substantially vertical) located at a crop transition zone between the side draper conveyors and the rearfeeder drum with retractable fingers. The crop coming from the left and right endless belt conveyors thus needs to change its direction in the center of the platform from a lateral direction into a rearward direction. Under unfavorable circumstances, this area can be due to lack of moving feed elements between the rear end of the center conveyor and the upperfeeder drum subject to crop stalling, which allows crop to leak from the platform, causing crop losses and/or material to lodge in the left and right endless belts with the result of belt stalling. With the use of this new transition conveyors, which are disk-shaped and have fingers that are distributed around their circumference, John Deere platform could improve the flow of crop material at the transition zone. However, having studied other similar mechanisms, it is for sure that this new development will do nothing to help the mobilization at the dead zone (the central portion of the platform, just behind the cutterbar and before the central draper conveyor).

DETAILED DESCRIPTION OF THE INVENTION

Although the invention is described in connection with certain preferred embodiments and referring to the aforementioned figures, it is understood that this invention is not limited to these particular exemplifications. In contrast, the patent is intended to cover all alternatives, modifications and equivalent arrangements as may be included within the spirit and scope of the invention as defined by the claims set forth hereinafter.

Figure 1:
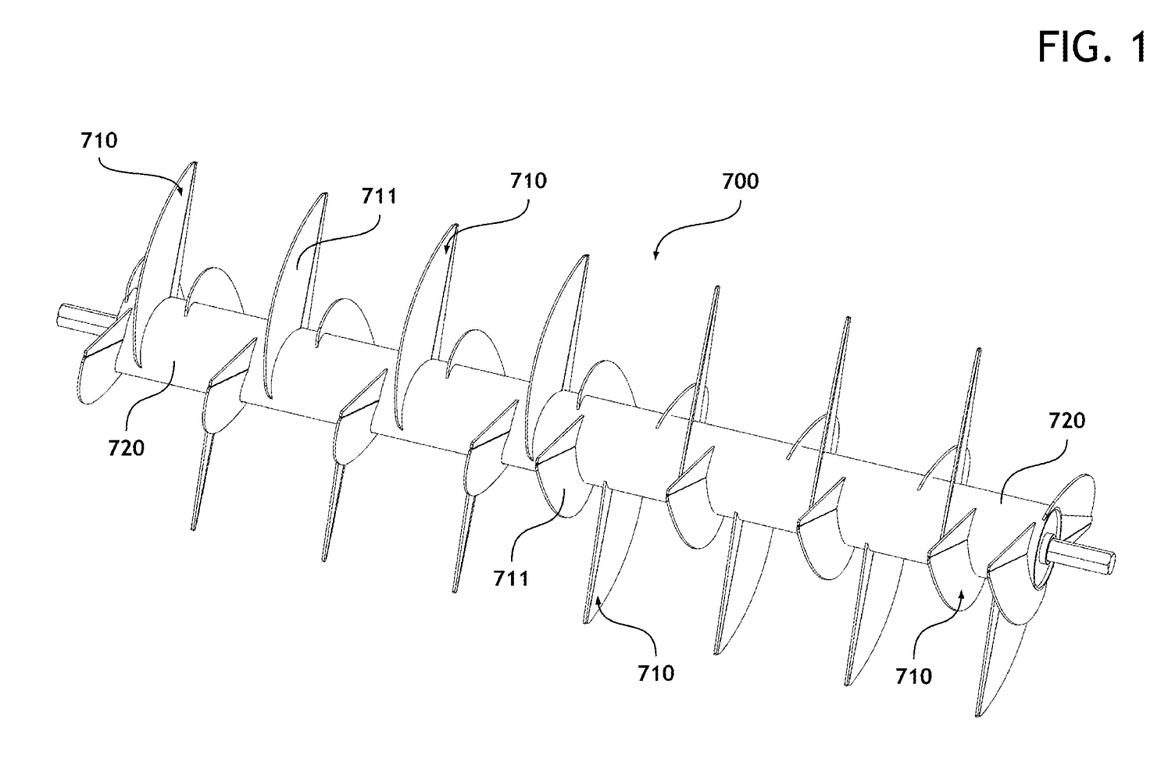
FIG. 1 is a top front perspective view illustrating a feeder drum with convex fins isolated in accordance with the present invention.

Referring now to the drawings, particularly to FIG. 1, the feeder drum 700 selected for illustration is constructed as a tube 720 to which is attached a set of fins or vanes 710. The feeder drum 700 is configured to be driven to rotate so that its fins 710 push the desired material according to a direction essentially normal to the rotation axis. Preferably, fins or vanes 710 present an elongated side face 711 which act on the material. This elongated face 711 enhances the surface area of contact to cause minimum damage to crop material.

Figure 2:
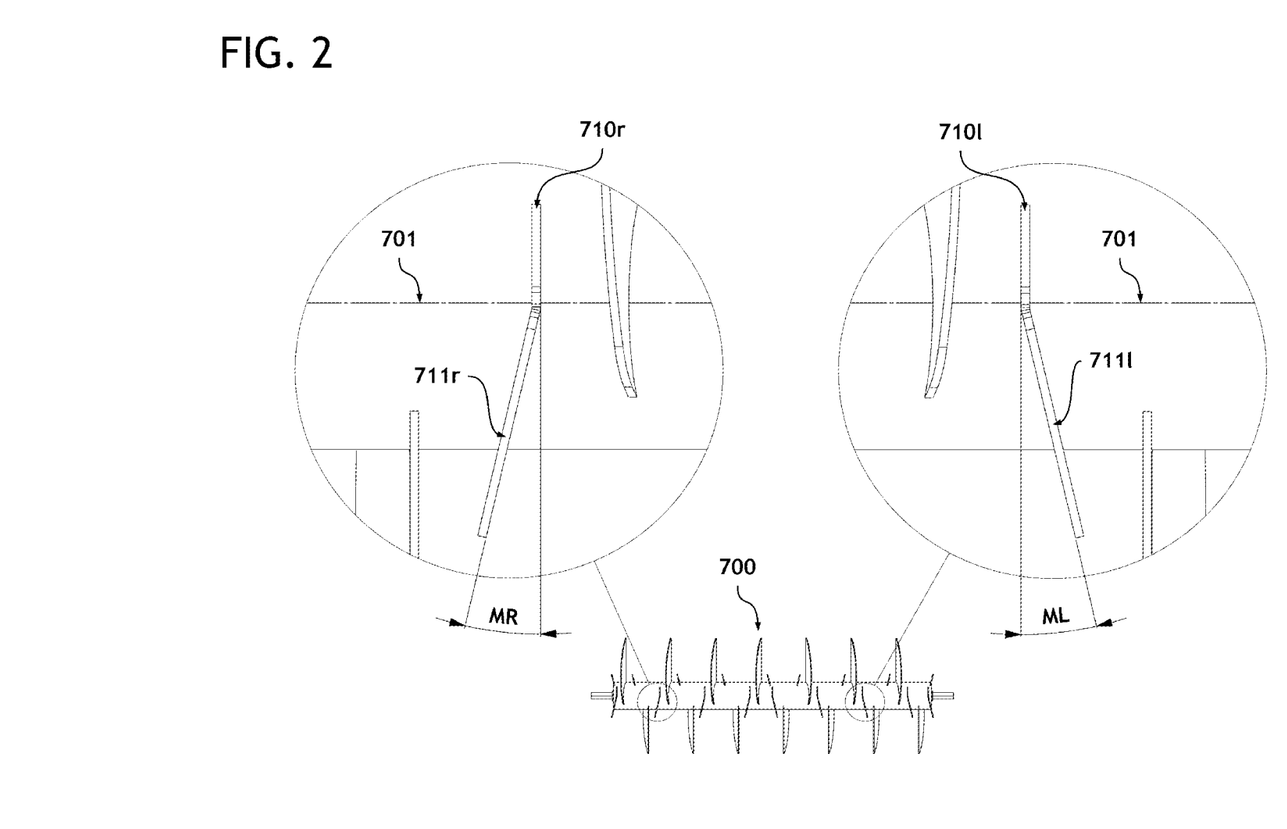
FIG. 2 is a detail front view of two fragments of the feeder drum shown in FIG. 1, where the convex fins are arranged oblique relative to the axis of rotation of the respective drum.

As shown in FIG. 2, the fins 710 are constructed of two dissimilar ways, right and left. Rights fins 710r are mounted on the tube 720 so that its elongated face 711r is disposed at an angle MR to the left of the plane perpendicular to the rotation axis 701 of the feeding drum 700. The left fins 710l, however, are mounted on the tube 720 so that its elongated face 711l is disposed at an angle ML to the right of the plane perpendicular to the rotation axis 701 of the feeding drum 700. This particular arrangement of fins 710r, 710l allow the feeding drum 700 to push the material into two new directions: left to right thanks to left fins 710l and right to left thanks to right fins 710r. Importantly, although the preferred configuration exemplified in the figures shows the feed drum 700 with one half of the tube 720 filled with left fins 710l and the other half filled with right fins 710r, it could be desired to have greater amounts of movements to the material by the alternate arrangement of the left and right fins 710l, 710r without affecting the spectrum scope of the following invention.

It could be also noticed that changes on the angles MR, ML of the fins 710r, 710l could be implemented without affecting the spectrum scope of the following invention.

Figure 3:
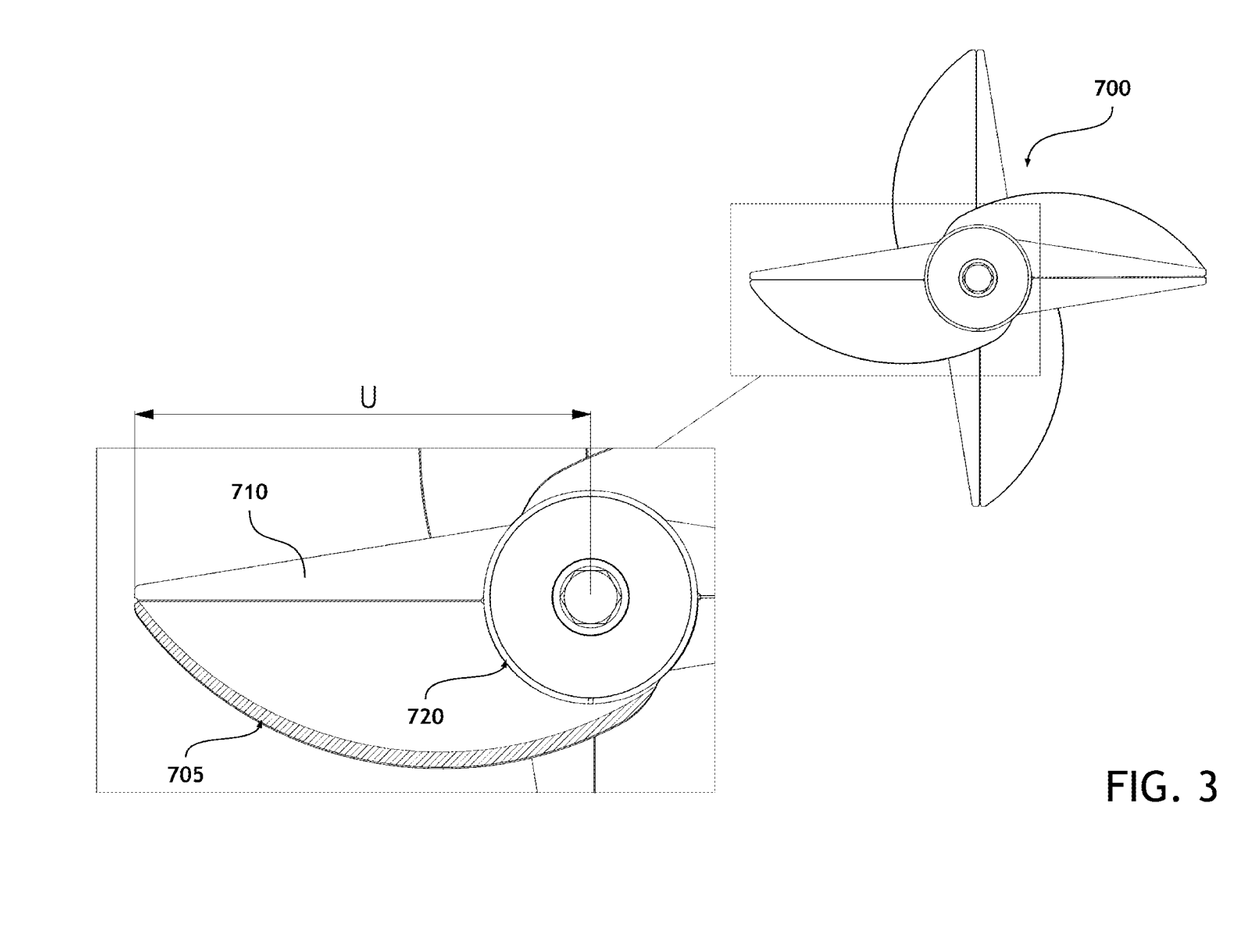
FIG. 3 is a detail lateral view of a side cut of the feeder drum shown in FIG. 1, where the convex shape of a fin is being highlighted.

FIG. 3 exemplifies an important aspect of the present invention, where the preferred geometric shape for the face 705 of the fin 710 that works in contact with the material to be transported is shown. Material-pushing face 705 is described as a convex profile with respect to the rotation direction G of the feeding drum 700. In the detail view, the convexity of said face 705 is highlighted by the striped area (hatch pattern). Thanks to this particular construction of the fins 710, transported materials such as crop or any other containing strands are prevented from wrapping around the central tube 720 when powered by said feed drum 700. Additionally, both the diameter D of the tube 720 and the range U of fins 710 might be varied in different proportions according to specific needs, without altering the spirit and scope of the present invention.

Figure 4:
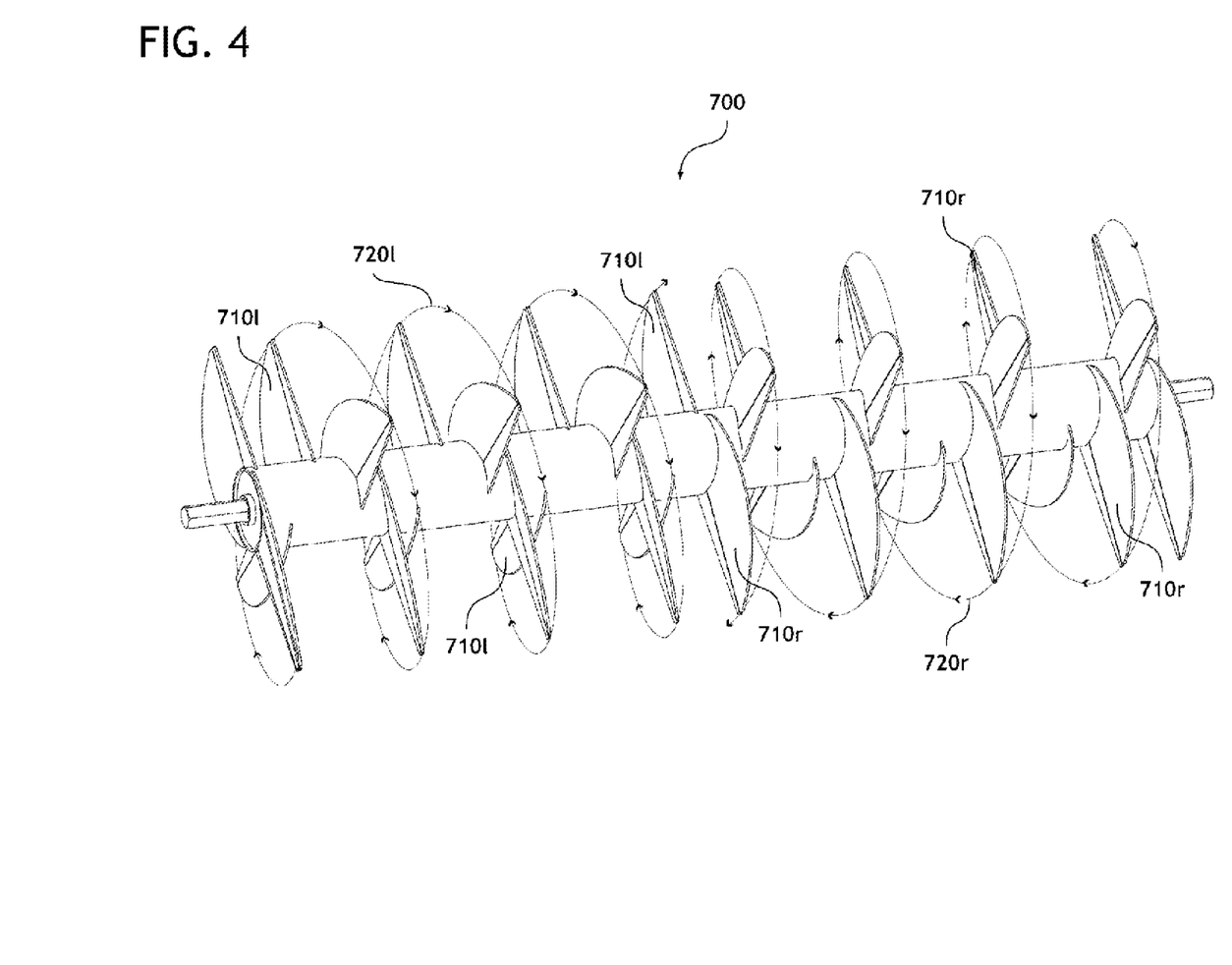
FIG. 4 is a top rear perspective view of the feeder drum shown in FIG. 1, where two opposite helix curves have been outlined to show the path through which fins are arranged.

Referring now to FIG. 4, two helices 720l, 720r are arranged on a feed drum with convex fins 700 to reveal another preferred constructive aspect the present invention. Thus, a set of right fins 710r is disposed around the tube 720 along a first helical curve 720r, while a set of left fins 710l is disposed around said tube 720 along a second helical curve 720l. The first helical curve 720r has a meaning different from that of the second 720l helical rotation curve. When the feeder drum 700 rotates in the working direction G, the first helical curve 720r is defined as a left-handed spiral when the observer's viewing line is set along the helix rotational axis, if said helix is rotated in a counter-clockwise direction and it moves away from the observer, then it is called a left helix, while the second helical curve 720l is defined as a right-handed spiral when the observer's viewing line is set along the helix rotational axis, if said helix is rotated in a counter-clockwise direction and it moves nearer to the observer, then it is called a right helix.

Thus, the feed drum 700 exemplified (when rotated in the working direction G is able to move the material along two directions relative to its rotational axis 701: a first transverse direction and a second longitudinal direction. The first transverse direction is defined rearward when the material passes below the axis of rotation 701 or forward when the material passes over the rotating shaft 701. Regarding the second longitudinal direction, the amount of alternation depends on the arrangement of the fins 710; the feed drum 700 embodied in FIG. 4 is capable of moving the material from right-to-left and from left-to-right. Moreover, fins 710l, 710r could be partially or totally replaced by screw flightings (blades) configuring an auger type conveyor without interfering with the scope of the present invention.

Figure 5:
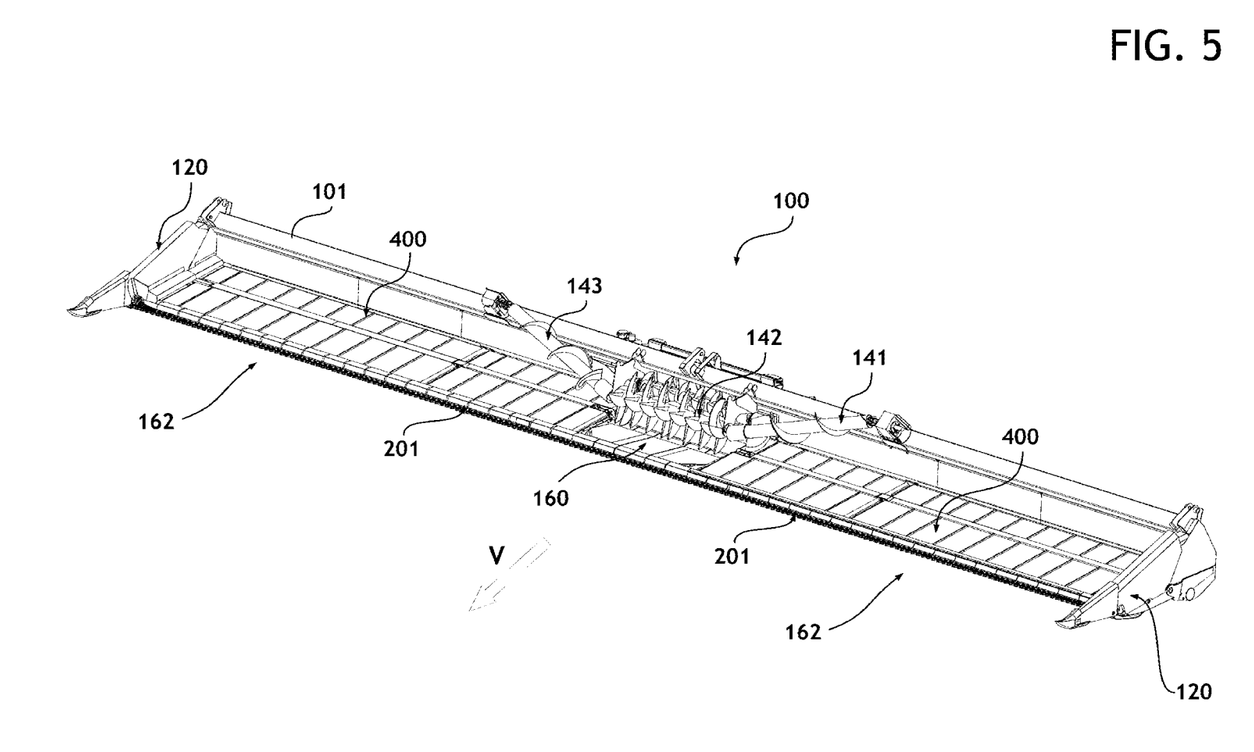
FIG. 5 is a front perspective view of an agriculture platform which features a set of the convex fins feeding drums relative to the present invention.
Figure 6:
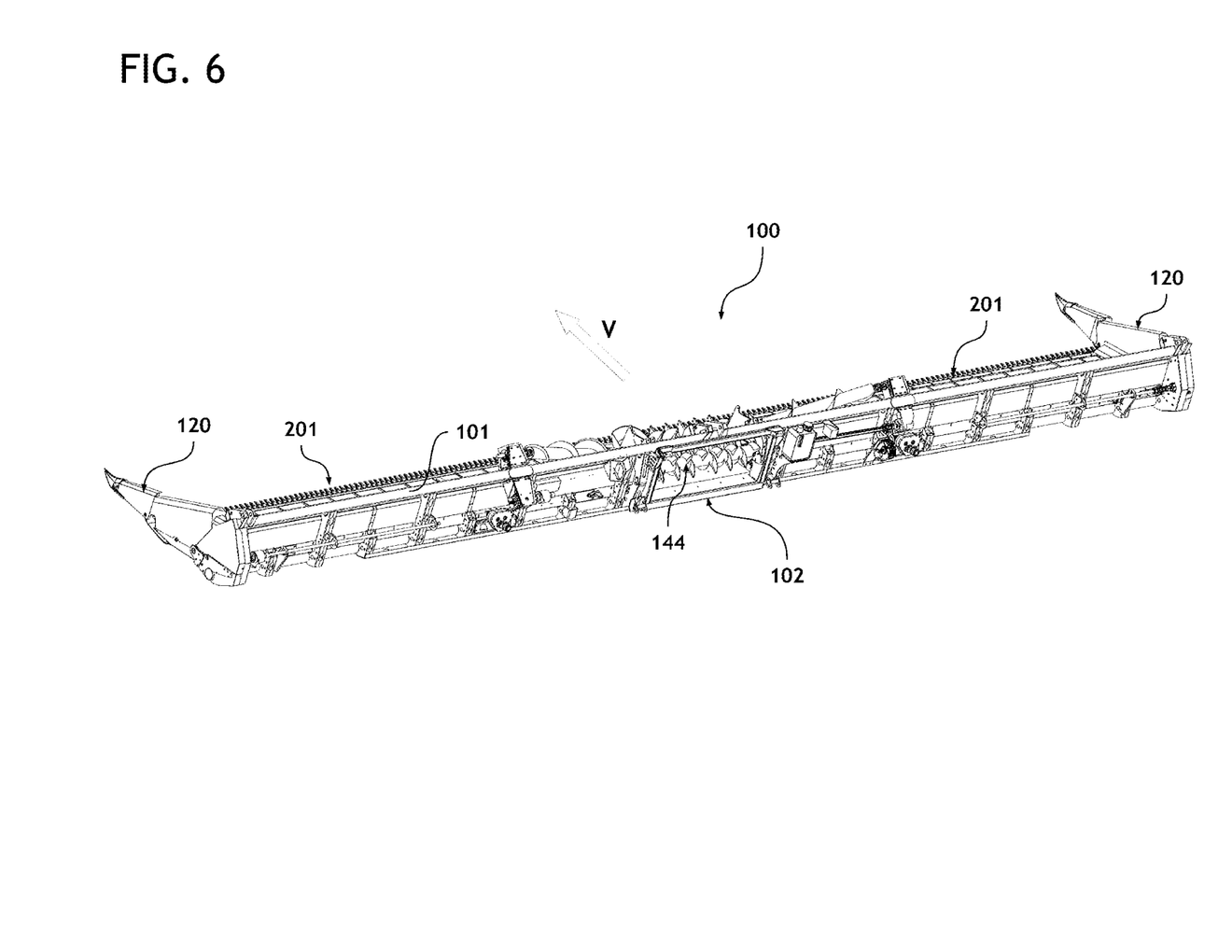
FIG. 6 is a rear perspective view of the platform shown in FIG. 5. This figure shows the spatial position of a feeder drum adjacent to an open end of the platform.
Figure 7:
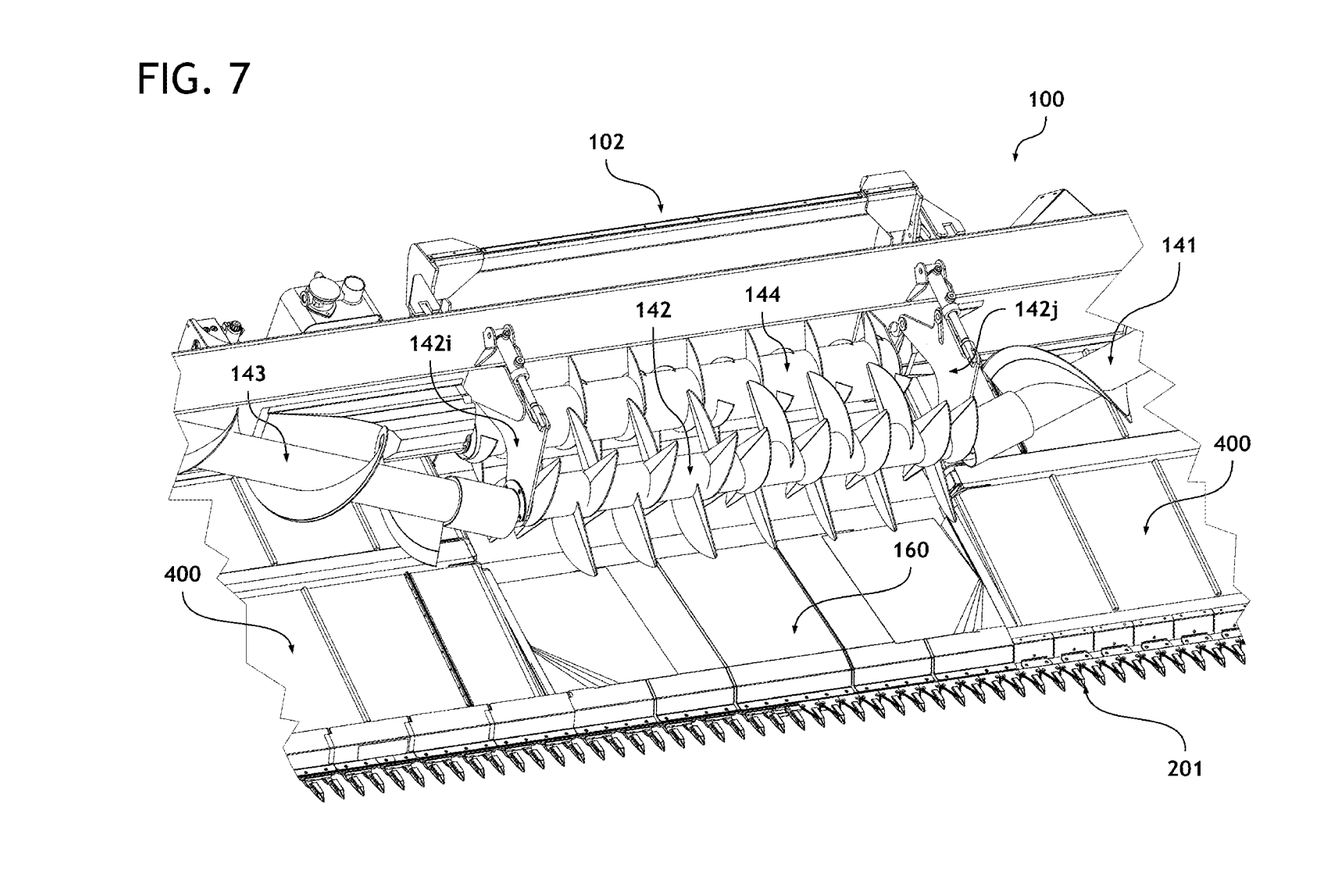
FIG. 7 is a front perspective detailed view of a fragment of the platform shown in FIG. 5. This figure shows a particular embodiment where a set of convex fins feeder drums are disposed at the open end where the platform is attached to a combine tractor.

There are many applications where the feeder drum with convex fins 700 is suitable for utilization. The particular interest is the installation of said feeder drums 700 on an agricultural platform used for harvesting crops. Referring to FIGS. 5-7, the harvester head selected for illustration comprises a flexible platform 100 mountable to a combine tractor, preferably harvesters. The platform 100 is configured to cut and harvest the crop when advanced in a direction V generally forward, so that the material is directed to an open end 102 of the platform and subsequently processed by other elements (not shown) of the agricultural threshing machine (not shown) to finally produce grains.

The platform 100 illustrated generally includes a chassis 101, which is subdivided according to a central section 160 which projects forwardly of the open end 102, and at least two side sections 162 projecting laterally on each side of said central section 160. All sections 160, 162 are bounded at the front by the cutterbar assembly 201 and bounded at the back by the main frame 101. The side sections 162 comprises a plurality of support arms 501 responsible for holding the cutterbar assembly 201 and responsible for sustaining partially the draper assembly 400. Draper assembly 400 is configured to transport the cut crop from the side sections 162 to the center section 160. The platform 100 also contains a central auger assembly 140 containing a right oblique auger 143, a left oblique auger 141, a central front conveying drum 142 and central rear conveying drum 144; contains a reel (not shown) extending laterally for almost the full width of the platform 100 and operates to push inward standing crop platform 100. Both of the cutterbar assembly 201 as the draper conveyor 400 are preferably flexible so that the platform 100 can work virtually attached to the floor and adapted changing to the same curved profile of the ground while is operated. The platform 100 cited in the present invention is configured such that when advanced in the direction V it leads the standing crop to the draper assembly 400 with the reel (not shown) while it is severed by the cutterbar assembly 201. The cut crop falls onto the conveyor canvases 400 that carry it to the central section 162 where the set of augers 140 ultimately redirect through the open end 102 to the feeder of the threshing machine (not shown) to be subsequently treated.

Figure 8:
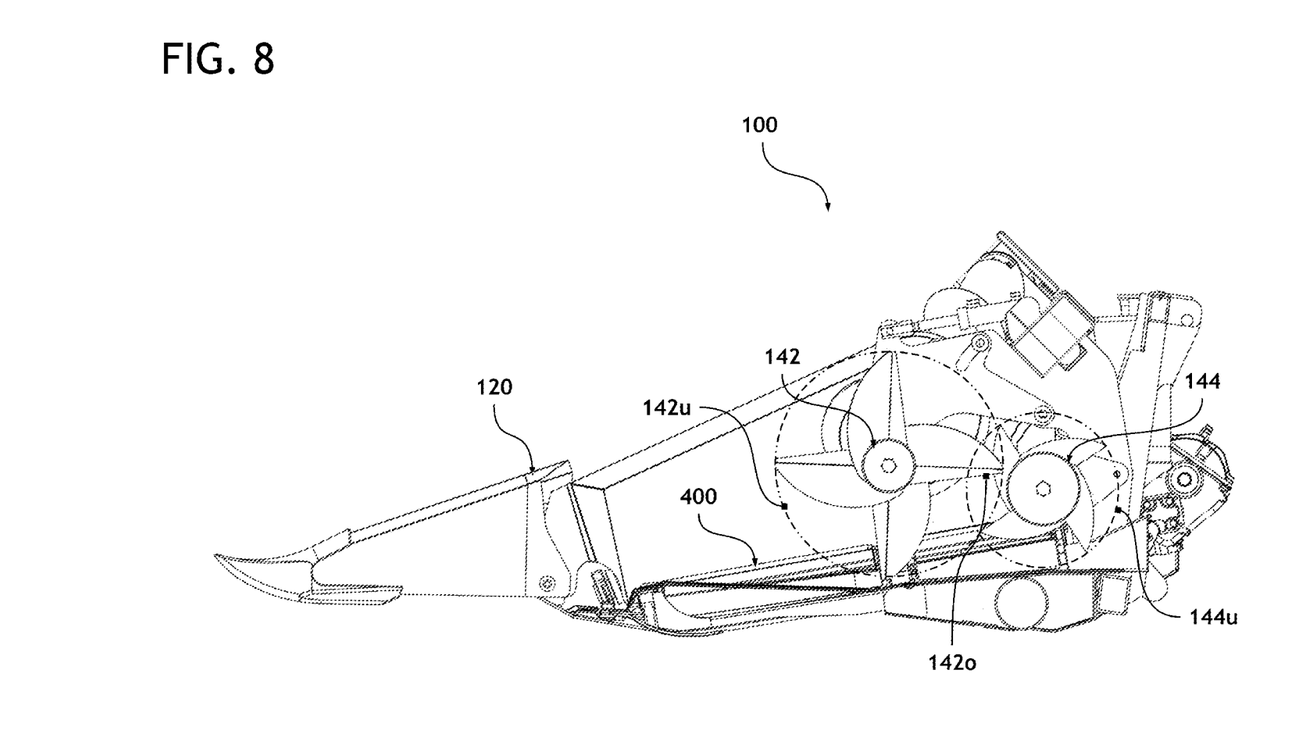
FIG. 8 is a side cut view of the central section of the platform shown in FIG. 5. This figure shows a particular embodiment where the convex drums are disposed with their fins overlapped.

Referring now to FIGS. 7 and 8, the preferred arrangement is shown with two feeder drums 700 installed in an agricultural platform 100. Both the front conveying drum 142 and the rear conveying drum 144 are constructed with aforementioned convex fins 700. The cut crop the reaches the central region 160 of the platform 100 is trapped by the central set of augers 140 and forced by these to pass through the said open end 102 (FIG. 6). Also, it is important to notice that the additional right oblique auger 143 and left oblique auger 141 could be removed without interfering with the scope of the present invention.

Importantly, both feed drums 142, 144 might be synchronized. A feature of a synchronized system is that the range of the fins 710 of both drums 142, 144 could be set overlapped determining an intersecting region 142o (FIG. 8); and when fins 710 are helix-arranged synchronization causes no fin interference. Thus a self-cleaning function of the system is defined, where the fins 710 of the rear drum 144 passes through the space between the fins 710 of the front drum 142, preventing long strands of material (and other plants) to wrap around the drums 142, 144.

Another medular feature of the auger assembly 140 is the regulation of the relative positions between the drums 142, 144. The spatial position of the rear drum 144 can be adjusted independently of the respective rear drum 144. As shown in FIG. 7, the rear feeder drum 144 and the front feeder drum 142 both have a hanger at each end. Front feeder drum 142 is rotary mounted on a forward aspect of the corresponding hangers 142i, 142j while a rearward aspect of said hangers 142i, 142j is attached to the main frame 101. Rear feeder drum 144 is rotary mounted on a forward aspect of the corresponding hangers 144i, 144j (not shown) while a rearward aspect of said hangers 144i, 144j (not shown) is attached to the main frame 101. In a preferred embodiment, the front drum 142 is adjustable both in height and in a fore-and-aft direction (forward-rearward direction) relative to the respective rear drum 144 by a pair of hydraulic cylinders which are actuated during operation in real time from inside the cab of the combine tractor to which the corresponding platform 100 is attached; the position of the rear drum 144 is manually adjustable when the platform is stopped.

As shown in FIG. 8, another important feature of the present invention is the different diameters 142u, 144u of the feeder drums 142, 144. In a preferred configuration, the diameter of the tube of the rear drum 144 is greater than front drum 142, while the overall diameter 144u of the rear drum 144 is smaller than the overall diameter 142u of the front drum 142. Whit such configuration, material is slightly compressed and pushed rapidly by the front feeder drum 142 towards the rear feeder drum 144. Then, the rear feeder drum 144 highly compresses the material and send it slowly across the open end 102 of the main frame 101 to the feeder of the combine tractor (not shown) where the platform is attached.

What is claimed is:

1. An agricultural platform (100) used to harvest crops, said platform is configured to be supported at an open end (102) that is set up to receive severed crop materials, said platform comprising:
 a main frame (101) includes the open end, said main frame (101) extending lengthwise in a lateral direction relative to a normal direction of travel of the agricultural platform (100);
 a cutterbar assembly (201) that extends laterally across an entire transverse extent of the agricultural platform (100), wherein said cutterbar assembly (201) being disposed at a forward edge of the agricultural platform (100);
 a transition area extending from said open end (102) to said cutterbar assembly (201);
 a draper assembly (400) disposed behind the cutterbar assembly (201) to convey a cut crop material severed by said cutterbar assembly (201) inwardly toward said transition area of the agricultural platform (100); and
 a feeder drum (700) rotary attached to the main frame (101), the feeder drum comprising a plurality of fins (710) attached to a cylinder (720), wherein each one of said fins (710) include a front face and a rear face with respect to a rotational direction of the feeder drum (700), the front face of each fin includes convex profile (705) configured to drive the crop material in a direction perpendicular to a rotational axis (701) of the feeder drum (700) while the feeder drum rotates;
 wherein each fin (710) radially presents a top portion and a bottom portion with respect to a rotational axis (701) of the feeder drum (700);
 wherein the front and the rear faces of each fin (710) outwardly converging at the top portion in a tapered tip, the tapered tip projecting away from the cylinder;
 the feeder drum (700) is located at said transition area to receive the cut crop material from the draper assembly (400) and to carry the cut crop material rearward towards said open end (102) through which crop is fed.

2. The agricultural platform (100) according to claim 1, wherein each of said fins (710) include at least one elongated side face (710s) extending from the front face to the rear face;
 said elongated side face being disposed oblique to the rotational axis (701) of the feeder drum (700);
 the obliqueness of said fins (710) being configured to drive the material in a direction parallel to the rotational axis (701) of the feeder drum (700) while the latter rotates.

3. The agricultural platform (100) according to claim 1, wherein the cylinder (720) of the feeder drum (700) includes a first section and a second section;
 wherein a first set (710r) of said fins (710) are arranged along the first section of the cylinder forming a first helical curve (720r);
 wherein a second set (710l) of said fins (710) are arranged along the second section of the cylinder forming a second helical curve (720l); and
 the first and second helical curves are cylindrical helices surrounding the first and the second section of the cylinder (720) respectively.

4. The agricultural platform (100) according to claim 3, wherein said first helical curve (720r) being defined as a left-handed helix and wherein said second helical curve (720l) being defined as a right-handed helix, said first set of fins (710r) drive the material in a right-to-left direction parallel to the rotational axis (701) of the feeder drum (700) while the feeder drum rotates, wherein said second set of fins (710l) drive the material in a left-to-right direction parallel to the rotational axis (701) of the feeder drum (700) while the feeder drum rotates.

5. An agricultural platform (100) used to harvest crops, said platform operable to be supported at an open end (102) that is configured to receive severed crop materials, said platform comprising:
 a main frame (101) operable to be mounted to the open end, said main frame (101) extending lengthwise in a lateral direction relative to the normal direction of travel of the agricultural platform (100);
 a cutterbar assembly (201) that extends laterally across substantially an entire transverse extent of the agricultural platform (100), wherein said cutterbar assembly (201) being disposed at a forward edge of the agricultural platform (100);
 a transition area extending from said open end (102) to said cutterbar assembly (201);
 a draper assembly (400) disposed behind the cutterbar assembly (201) to convey cut crop material severed by said cutterbar assembly (201) inwardly toward said transition area of the agricultural platform (100); and
 a rear feeder drum (144) and a front feeder drum (142) are rotably attached to the main frame (101), the rear feeder drum and the front feeder drum each comprising a plurality of fins (710) attached to a cylinder (720), wherein said fins (710) presenting a front face and a rear face with respect to a rotational direction of the rear (144) or the front (142) feeder drum, the front face of each fin includes a convex profile (705) configured to drive the material in a direction perpendicular to the rotational axes of the rear and the front feeder drums
 the fins (710) radially presenting top and bottom portions with respect to a rotational axis (701) of the feeder drum (700);
 the front and rear faces of each fin (710) outwardly converging at said top portion to a tapered tip;
 the rear feeder drum (144) is located at said transition area adjacent to the open end (102);
 the front feeder drum (142) is located at said transition area between the cutterbar assembly (201) and said rear feeder drum (144);
 both the rear feeder drum (144) and the front feeder drum (142) being configured to receive cut crop material from the draper assembly (400) and to carry the crop material rearward towards said open end (102) through which crop can be fed.

6. The agricultural platform (100) according to claim 5, wherein both the rear feeder drum (144) and the front feeder drum (142) having a hanger at each end, said rear feeder drum (144) being rotary mounted on a forward aspect of the corresponding hangers (144i, 144j) and a rearward aspect of said hangers (144i, 144j) being attached to the main frame (101) of the agricultural platform (100), said front feeder drum (142) being rotary mounted on a forward aspect of the corresponding hangers (142i, 142j) and a rearward aspect of said hangers (142i, 142j) being attached to the main frame (101) of the agricultural platform (100).

7. The agricultural platform (100) according to claim 6, wherein said hangers (142i, 142j) being disposed to allow said front feeder drum (142) to be moved in fore-and-aft and up-and-down directions.

8. The agricultural platform (100) according to claim 6, wherein said hangers (144i, 144j) being disposed to allow said rear feeder drum (144) to be moved in fore-and-aft and up-and-down directions.

9. The agricultural platform (100) according to claim 5, wherein the diameter of said rear feeder drum (144) is different that the front feeder drum (142).

10. The agricultural platform (100) according to claim 5, wherein the width of the fins of said rear feeder drum (144) is different that the fins of the front feeder drum (142).

11. The agricultural platform (100) according to claim 5, wherein each of the fins of said front feeder drum (142) comprising an elongated side face, said elongated side face being disposed oblique to the rotational axis of the front feeder drum (142); the obliqueness of said fins being configured to drive the material in a direction substantially parallel to the rotational axis of the front feeder drum (142) while the latter rotates.

12. The agricultural platform (100) according to claim 5, wherein each of the fins of said rear feeder drum (144) comprising an elongated side face, said elongated side face being disposed generally perpendicular to the rotational axis of the rear feeder drum (144).

13. The agricultural platform (100) according to claim 5, wherein the fins of said rear feeder drum (144) are disposed overlapped with the fins of said front feeder drum (142).

14. The agricultural platform (100) according to claim 5, wherein said rear feeder drum (144) and said front feeder drum (142) are one of rotationally driven and rotating idler; said rear feeder drum (144) and said front feeder drum (142) turn with synchronization.

15. The agricultural platform (100) according to claim 5, wherein the diameter of tube of said rear feeder drum (144) is different that the tube of the front feeder drum (142).

\* \* \* \* \*